(12) United States Patent
An et al.

(10) Patent No.: US 11,827,181 B2
(45) Date of Patent: Nov. 28, 2023

(54) MOVABLE CARRIER DEVICE FOR VEHICLES

(71) Applicants: HYUNDAI MOTOR COMPANY, Seoul (KR); KIA CORPORATION, Seoul (KR); NIFCO KOREA INC., Anyang-si (KR)

(72) Inventors: Hyeon Ju An, Suwon-si (KR); Kwang Kyu Han, Osan-si (KR); Byung Seok Kong, Gunpo-si (KR); Jong Chae Lee, Anyang-si (KR)

(73) Assignees: HYUNDAI MOTOR COMPANY, Seoul (KR); KIA CORPORATION, Seoul (KR); NIFCO KOREA INC., Seoul (KR)

( * ) Notice: Subject to any disclaimer, the term of this patent is extended or adjusted under 35 U.S.C. 154(b) by 224 days.

(21) Appl. No.: 17/383,146

(22) Filed: Jul. 22, 2021

(65) Prior Publication Data

US 2022/0169182 A1 Jun. 2, 2022

(30) Foreign Application Priority Data

Nov. 30, 2020 (KR) .................. 10-2020-0163622

(51) Int. Cl.
 *B60R 7/04* (2006.01)
(52) U.S. Cl.
 CPC .................................... *B60R 7/04* (2013.01)
(58) Field of Classification Search
 CPC .. B60R 7/04; B60N 2/02; B60N 2/919; B60N 3/00; H01F 7/0242; H01F 7/0257; H01F 7/206

USPC ............... 296/24.34, 37.1, 37.8, 64
See application file for complete search history.

(56) References Cited

U.S. PATENT DOCUMENTS

| | | | |
|---|---|---|---|
| 10,549,659 B2 | 2/2020 | Sullivan et al. | |
| 11,305,698 B2* | 4/2022 | Atang | B60R 7/04 |
| 2006/0226939 A1* | 10/2006 | Dimig | F16D 49/20 335/205 |
| 2007/0119885 A1* | 5/2007 | Miller | B60R 7/088 224/183 |
| 2020/0346561 A1* | 11/2020 | Dry | B60N 2/0715 |
| 2020/0391668 A1* | 12/2020 | Dry | B62D 33/06 |
| 2021/0086699 A1* | 3/2021 | Chen | B60R 7/04 |
| 2021/0107419 A1* | 4/2021 | Ricart | B60R 16/0231 |

FOREIGN PATENT DOCUMENTS

| | | |
|---|---|---|
| JP | 2018-020665 A | 2/2018 |
| KR | 2004-0000244 A | 1/2004 |
| KR | 10-1125280 B1 | 3/2012 |
| KR | 10-2117034 B1 | 6/2020 |

* cited by examiner

*Primary Examiner* — Lori Lyjak
(74) *Attorney, Agent, or Firm* — MCDONNELL BOEHNEN HULBERT & BERGHOFF LLP (57) ABSTRACT

A movable carrier device for vehicles including a rail section positioned in a vehicle floor, a storage section movable along the rail section, a magnetic section located in the storage section so as to be movable along the rail section, a locking unit fastened to the floor and the storage section to restrict the movement of the storage section, and a controller configured to control the locking unit such that the storage section and the locking unit are fastened to each other.

13 Claims, 7 Drawing Sheets

MOVABLE CARRIER DEVICE FOR VEHICLES

CROSS REFERENCE TO RELATED APPLICATIONS

The present application claims priority to Korean Patent Application No. 10-2020-0163622, filed on Nov. 30, 2020, the entire contents of which is incorporated herein for all purposes by this reference.

BACKGROUND

Field

The present disclosure relates to a movable carrier device for vehicles and, more preferably, to a movable carrier device for vehicles, the movable carrier device being configured to allow a storage section thereof to be movable along a rail unit buried in a floor so that the storage section is movable along a path of the rail unit.

Description of the Related Art

With the recent advent of autonomous vehicles, a degree of freedom of a seat space inside a vehicle is provided. In the existing vehicle, however, there is no configuration to enable easy turning or horizontal movement of vehicle seats.

To solve this problem, in this case, it is important to provide a movable configuration capable of allowing for easy displacement such as rotation or linear movement of vehicle seats as well as for safe mounting of the vehicle seats on a vehicle body along with such movability. To this end, a locking method or apparatus for locking the displacement of the vehicle seats to the vehicle body is required.

Moreover, in the case of a storage section located in a vehicle interior in addition to vehicle seats, a movable carrier device capable of moving along at least one direction of the vehicle according to the arrangement of the vehicle seats and the user's request is needed.

That is, there is a need in vehicle seats for a storage section that is movable to various positions along the upper surface of a floor according to the degree of freedom of an indoor environment of a vehicle.

SUMMARY

Accordingly, the present disclosure has been made keeping in mind the above problems occurring in the related art, and an objective of the present disclosure is to provide a movable carrier device for vehicles, the movable carrier device being configured to allow a storage section thereof to be movable to various positions in a vehicle interior.

In addition, another objective of the present disclosure is to provide a movable carrier device for vehicles, the movable carrier device being configured such that a movable storage section is locked by a locking pin buried in a vehicle floor through a locking unit located underneath the storage section so that the locking pin is fastened thereto, thereby locking the storage section in a stationary state.

The objectives of the present disclosure are not limited to the above-mentioned objectives, and other objectives of the present disclosure that are not mentioned can be clearly understood with reference to the following description and embodiments herein. In addition, the objectives of the present disclosure can be realized by the means described in the claims and combinations thereof.

In order to achieve the above objectives, according to one aspect of the present disclosure, there is provided a movable carrier device for vehicles, the carrier device including a rail section buried in a vehicle floor, a storage section movable along the rail section, a magnetic section located in the storage section so as to be movable along the rail section, a locking unit fastened to the floor and the storage section to restrict the movement of the storage section, and a controller configured to control the locking unit such that the storage section and the locking unit are fastened to each other.

In addition, the locking unit may include at least one locking pin disposed in the floor and protruding from the top of the floor, a magnetic guide section applying a magnetic force so that the locking pin comes into contact with the storage section, and a locking striker configured to surround at least a portion of the protruding locking pin so as to lock the storage section.

In addition, the locking pin may include a housing inserted and disposed in the floor, a plate part disposed on an upper end of the housing, a rod part disposed in the housing to perform a vertical movement, and a pin stopper disposed on the bottom of the rod part.

In addition, the locking striker may further include a claw to be fastened to the protruding locking pin.

In addition, the magnetic guide section may include an inlet part recessed in a height direction of the storage section, a pair of inclined parts disposed on both sides of the inlet part on the inner side of the storage section at a predetermined inclination angle in the height direction of the storage section, and a locking part disposed between the inclined parts and configured to come into contact with the locking pin.

In addition, the inclined parts and the locking part may be integrally formed, and the magnetic force of the locking part may be configured to be greater than that of the inclined parts.

Further, the inclined parts disposed on both sides of the inlet part may include inclined surfaces symmetrical to each other with respect to the locking part.

In addition, the controller may be configured to control an inclination angle of the inclined parts.

In addition, the controller may be configured to control a magnetic force applied to the magnetic guide section.

In addition, the rail part may have a thickness that increases from the center to the edge thereof.

In addition, the magnetic force of a lateral end of the magnetic part may be greater than the magnetic force applied to a central region and adjacent region thereof of the rail part.

In addition, the vehicle floor may have non-magnetic properties.

According to another aspect of the present disclosure, there is provided a movable carrier device for vehicles, the carrier device including a vehicle floor, a magnetic section movable over the vehicle floor, and a locking unit fastened to the floor and the magnetic section to restrict the movement of the magnetic section. The locking unit may include at least one locking pin disposed in the floor and protruding from the top of the floor, a magnetic guide section applying a magnetic force so that the locking pin comes into contact with the magnetic section, and a locking striker configured to surround at least a portion of the protruding locking pin so as to lock the magnetic section.

The present disclosure can obtain the following effects from combination and use relationships of configurations that will be described below in the present embodiments.

According to the present disclosure, the storage section is movable along the vehicle interior with a high degree of freedom, thereby improving user convenience.

According to the present disclosure, the storage section is configured to be movable along the rail unit buried in the floor, thereby increasing the aesthetics of the vehicle interior.

According to the present disclosure, the storage section is located in a locked position through a double locking structure, thereby having the effect of promoting the stability of the vehicle occupant.

DETAILED DESCRIPTION

Hereinafter, embodiments of the present disclosure will be described in more detail with reference to the accompanying drawings. The embodiments of the present disclosure may be modified into various forms, and the scope of the present disclosure should not be construed as being limited to the following embodiments, which are provided to more completely describe the present disclosure to an ordinary skilled person in the art.

In addition, terms such as " . . . section", " . . . part", " . . . unit", etc. described herein mean a unit portion that processes at least one function or operation, wherein the unit portion may be implemented by hardware, software or a combination of hardware and software.

In addition, it will be understood that, although the terms "first", "second", etc. may be used herein to distinguish elements because the name of the elements are the same, the elements are not necessarily limited to the order in the following description.

Hereinafter, exemplary embodiments will be described in detail with reference to the accompanying drawings. In the description, the same or corresponding constituent elements are assigned the same reference numerals, and redundant descriptions thereof will be omitted.

Figure 1A:
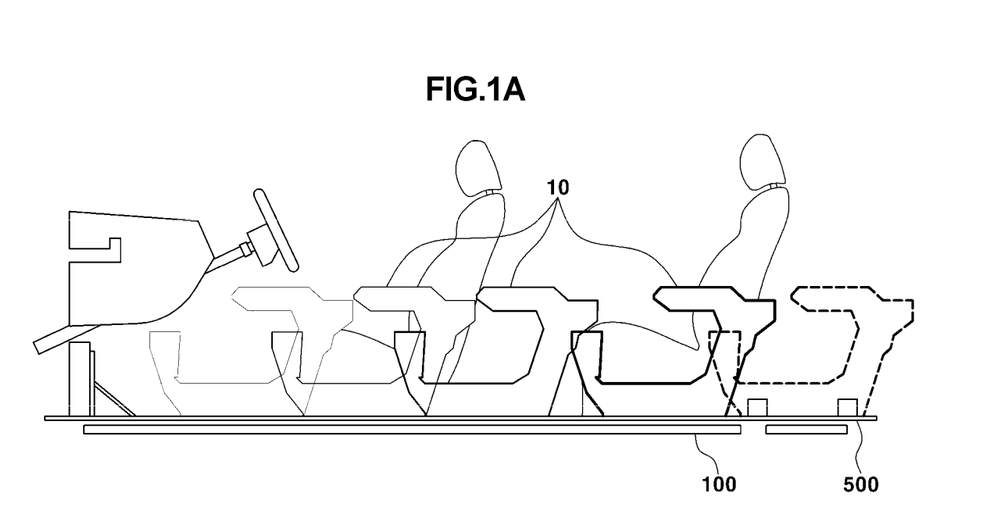
FIG. 1A is a side view illustrating a vehicle including a movable carrier device according to an embodiment of the present disclosure.
Figure 1B:
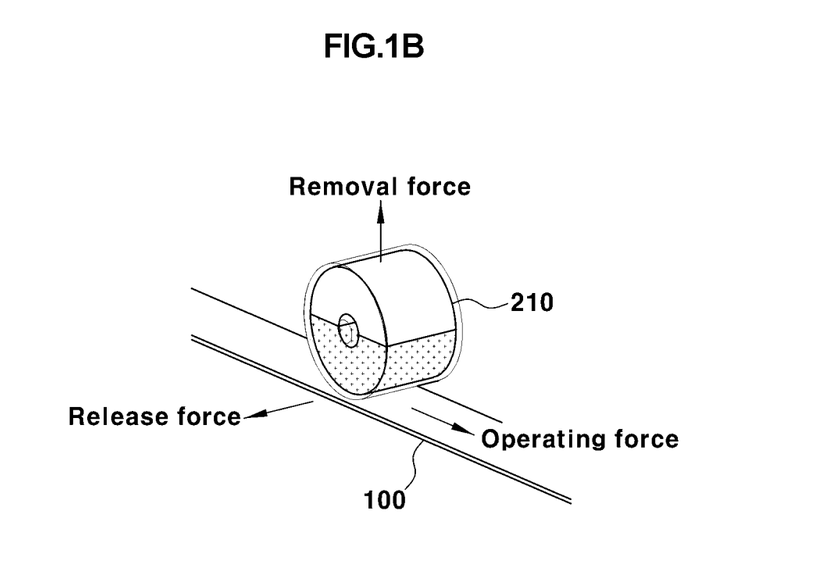
FIG. 1B is a view illustrating a configuration relationship between a magnetic section and a rail section of the movable carrier device according to an embodiment of the present disclosure.
Figure 1C:
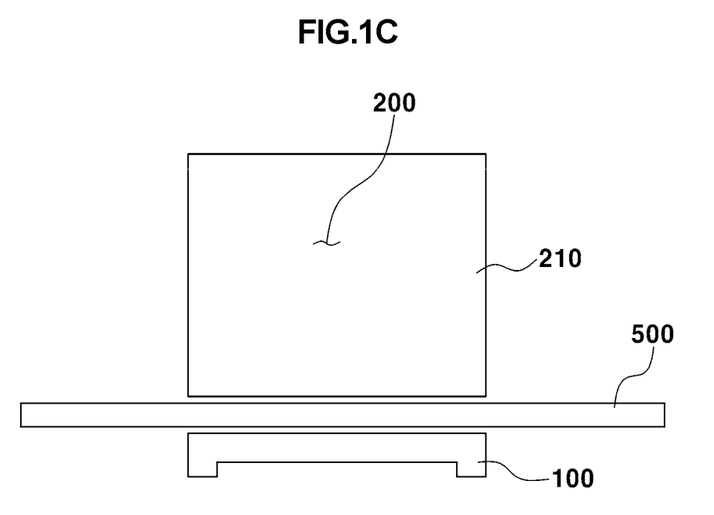
FIG. 1C is a front cross-sectional view illustrating the magnetic section and the rail section of the movable carrier device according to an embodiment of the present disclosure.
Figure 1D:
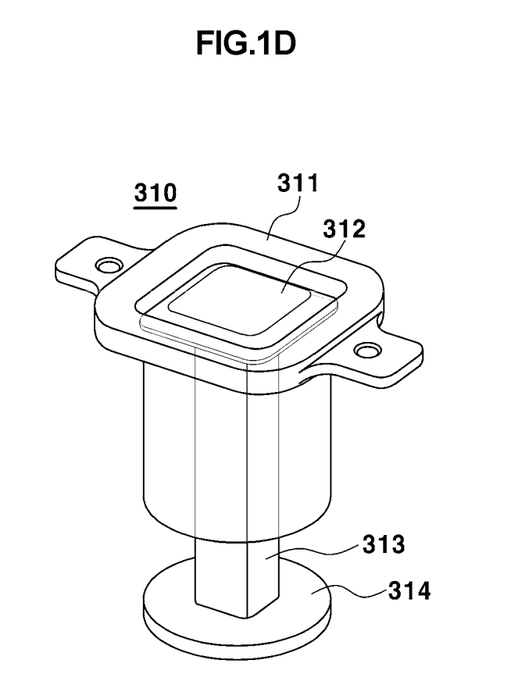
FIG. 1D is a perspective view illustrating a locking pin buried in a vehicle floor according to an embodiment of the present disclosure.

FIG. 1A illustrates a side view of a vehicle including a movable carrier device 10 according to an embodiment of the present disclosure, FIG. 1B illustrates the configuration of a magnetic section 210, FIG. 1C illustrates a front cross-sectional view of the configuration of the magnetic section and a rail section of the movable carrier device, and FIG. 1D illustrates a perspective view of a locking pin of a locking unit 300.

As illustrated, the movable carrier device 10 is disposed over a vehicle floor 500 so as to slide along the rail section 100 disposed inside the vehicle floor 500.

The movable carrier device 10 includes a storage section 200 configured to store a user's luggage or portable items, a magnetic section 210 located on the lower side of the storage section 200 and configured to move along the rail section 100, a locking unit 300 disposed inside of the floor 500 below the storage section 200 such that the locking unit is protruding and fastened to the storage section 200, and a controller 400 that controls the locking unit.

The controller 400 is configured to control the movement of the carrier device 10 according to a user's input, and is also configured to control the deployment of a locking striker 330 of the locking unit 300. In addition, the controller 400 may measure the position of the carrier device 10, control the magnetic force of the magnetic section 210 and a magnetic guide section 320, and adjust the inclination of an inclined part 322.

The rail section 100 is fixedly located on an undersurface of the floor 500, whereas the magnetic section 210 moves over the upper surface of the floor 500 in a contact state along the rail section 100 at an opposite position to the rail section.

The floor 500 may be made of a non-magnetic material having a thin thickness so as to prevent a change in magnetic force of the magnetic section 210 and the magnetic guide section 320 so that loss of the magnetic force is prevented.

In other embodiment, the magnetic section 210 may not include a separate storage section 200, and may be configured to include a storage space or an electrical component located inside the magnetic section 210.

Furthermore, in the same embodiment, the magnetic section 210 may freely move along the upper surface of the floor, and the floor may be configured to have the same physical properties as the rail section 100. In addition, the magnetic guide section 320 includes an inlet part 321 positioned in the magnetic section 210, and the locking pin 310 may be inserted into the inlet part 321 positioned in the magnetic section 210.

As disclosed in FIG. 1B, the magnetic section 210 is applied with an operating force in the longitudinal direction of the rail section 100 so that the magnetic section 210 can be moved along the rail section 100, a release force in the lateral direction of the rail section 100, and a removal force in the height direction on the plane where the rail section 100 is located.

In an embodiment of the present disclosure, the removal force needs the magnetic force greater than the release force and the operating force, and the release force needs the magnetic force greater than the operating force.

When the thickness of the floor 500 decreases, the magnetic force required for the operating force, the release force, and the removal force becomes greater, and when the thickness of a magnet increases and/or the thickness of the rail section increases, the magnetic forced required for the operating force, the release force, and the removal force becomes greater.

The magnetic section 210 is formed from a cylindrical roller to be fastened to the storage section 200, wherein N poles and S poles may cross to form the magnetic section 210.

Moreover, the magnetic section 210 may be set such that the magnetic force of the region close to both edges of the rail section 100 is greater than the magnetic force of the center region, thereby preventing the magnetic section 210 from being derailed from the rail section 100.

In addition, as illustrated in FIG. 1C, the rail section 100 is configured to increase in thickness from the center toward both lateral ends thereof so that the magnetic force required for the release force is increased. More preferably, the rail section 100 may be configured such that both lateral sides are bent downward in a direction perpendicular to the plane of the rail section 100.

As described above, according to the present disclosure, the thickness of both lateral sides of the rail section 100 may be set to be thicker than the central part to prevent the magnetic section 210 from being deflected in both lateral directions of the rail section 100.

FIG. 1D illustrates a coupling relationship between the configurations of the locking pin 310 positioned near the rail section 100.

The magnetic guide section 320 positioned on the undersurface of the storage section 200 or the magnetic section 210 is configured to include an inclined part 322 and a locking part 323, wherein the locking part 323 is configured so as to be coupled by the locking pin 310 located inside the floor 500. At least one locking pin 310 is positioned on the floor 500 along the direction in which the carrier device 10 is moved. Moreover, when the locking pin 310 is protruding and fastened with the magnetic guide section 320, the controller 400 controls a locking striker 330 of the locking unit 300 to deploy so that the locking striker 330 locks the locking pin 310. For example, when the carrier device 10 passes by the region of the floor 500 where the locking pin 310 is located, the controller 400 is configured to determine whether the carrier device is in a position requested by a user, and when the carrier device is in the requested position, to allow the locking pin 310 to be protruded, and to deploy the locking striker 330 to contact the protruding locking pin 310 so that the striker is fastened to at least a portion of a rod part 313 of the locking pin 310. Accordingly, the carrier device 10 may be locked in the space where the locking pin 310 is located.

The locking pin 310 includes a housing 311 having a hole buried inside the floor 500, a rod part 313 located inside the hole and moving along the longitudinal direction of the hole, a plate part 312 having a plane larger than the hole so that the plate part is moved together with the rod part 313 during the movement of the rod part, and a pin stopper 314 located at the bottom of the rod part 313 to prevent the rod part 313 from being separated from the housing 311 when the rod part 313 moves.

The locking pin 310 is configured to protrude upward through the floor 500 when the magnetic force of the magnetic guide section 320 located under the storage section 200 or the magnetic section 210 is applied so that the plate part 312 of the locking pin 310 is positioned to abut against the locking part 323. Furthermore, in a state in which the locking part 323 and the plate part 312 are in contact, the locking striker 330 disposed below the storage section 200 adjacent to the locking part 323 is deployed toward and fastened to the rod part 313.

As described above, according to the present disclosure, the plate part 312 is popped up/extended/protruded by magnetic force so that the locking striker 330 can be deployed toward and fastened to the protruding locking pin 310, and thus the locking pin 310 and the magnetic guide section 320 may provide a double locking structure.

In another embodiment of the present disclosure, the magnetic section 210 may be configured such that the locking pin 310 is inserted, and the locking striker 330 may be deployed to lock the locking pin 310. Thus, the magnetic section 210 can be held so as to be locked on the floor.

Figure 2:
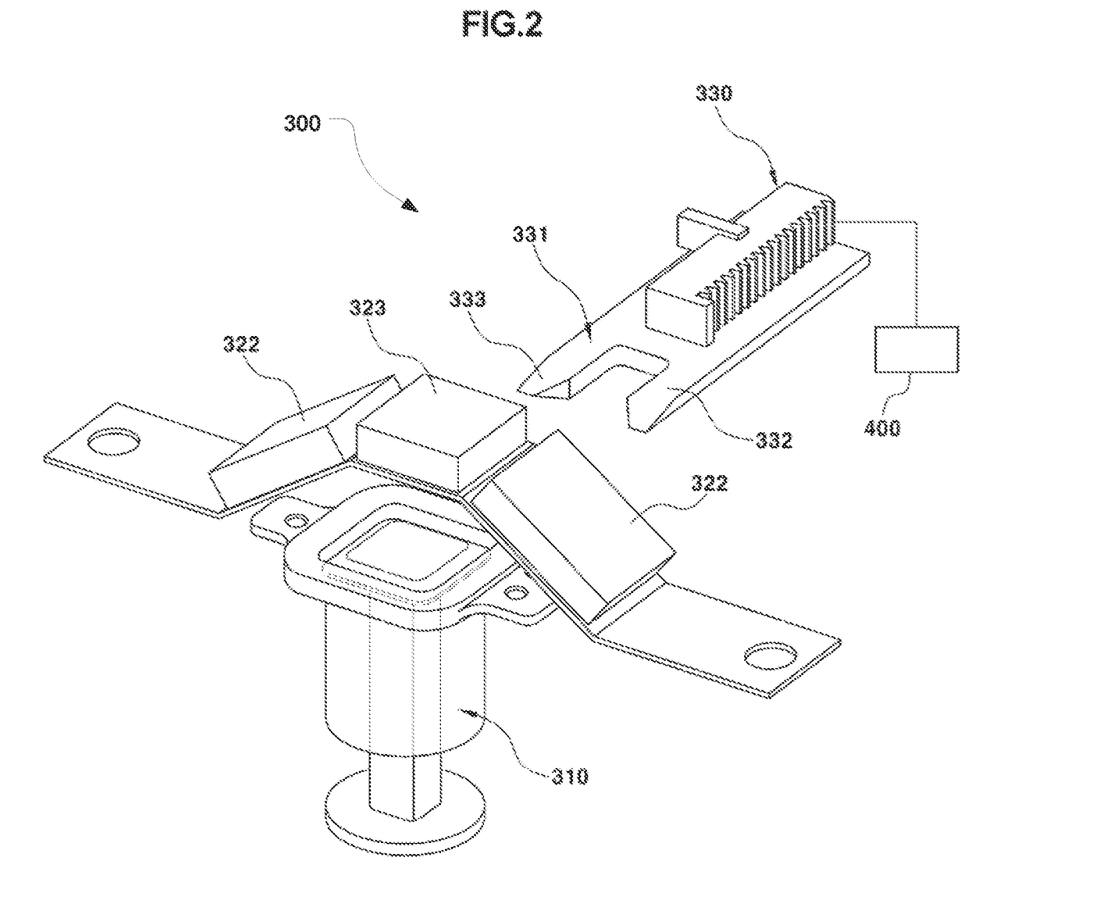
FIG. 2 is a perspective view illustrating a locking unit according to an embodiment of the present disclosure.

FIG. 2 illustrates the locking relationship of the locking unit 300 according to an embodiment of the present disclosure.

As illustrated, the locking pin 310 located inside the floor 500 is protruded by the magnetic force of the magnetic guide section 320 located inside the inlet part 321 recessed in the height direction of the storage section 200 or the magnetic section 210. That is, when the storage section 200 or the magnetic section 210 is moved to a position corresponding to the locking pin 310, the locking pin 310 is configured to protrude upward through the floor 500. More preferably, the plate part 312 of the locking pin 310 made of metal is configured to pop up in a direction close to the storage section 200 when the undersurface of the storage section 200 including the magnetic guide section 320 is adjacent thereto.

An inclined part 322 of the magnetic guide section 320 and the plate part 312 of the locking pin 310 are configured to first contact with each other, and the storage section 200 additionally moves so that the plate part 312 of the locking pin 310 is configured to come into contact with the locking part 323 where the deepest shape of the inlet part 321 is located. More preferably, the plate part 312 of the locking pin 310 is configured to pop up by the magnetic force of the locking part 323.

The inclined part 322 is positioned on both ends of the locking part 323 about the locking part 323 in the longitudinal direction of the carrier device 10. Moreover, the inclined part 322 is configured to be symmetrical at the same angle with respect to the center of the locking part 323.

The magnetic force applied from the inclined part 322 is smaller than the magnetic force applied from the locking part 323. When the inclined part 322 passes by the region where the locking pin 310 is located, the carrier device 10 is configured to slide over the floor 500. More preferably, plate part 312 of the locking pin 310 may be configured to protrude to a predetermined position when the inclined part 322 passes by the top of the plate part 312. That is, the plate part 312 located at a position corresponding to the inclined part 322 may be configured such that the plate part 312 protrudes to the region that does not interfere with the movement of the storage part 200.

The locking part 323 is located inside the inlet part 321 farthest from the top surface of the floor 500, but may be set to have a strong magnetic force, compared to the inclined part 322, and the plate part 312 of the locking pin 310 is configured to protrude through the upper surface of the floor 500 to contact one surface of the inlet part 321 where the locking part 323 is located.

Since the height of one end of the inclined part 322 may be controlled by the controller 400, the inclination of the inclined part 322 is controlled in comparison to the moving speed of the carrier device 10. Accordingly, the time during which the carrier device 10 interferes with the locking pin 310 may be reduced, thereby mitigating the impact applied to the carrier device 10.

In addition, the magnetic force of the magnetic guide section 320 may be controlled by the controller 400. As an example, in a state in which the carrier device 10 is moved to a position corresponding to the inclined part 322, a magnetic force is applied to the inclined part 322 and the locking part 323, and the carrier device 10 is located in the region requested by a user so that the locking part 323 and the locking pin 310 are closest to each other, whereby the magnetic force of the locking part 323 may be controlled to have a maximum value by the controller 400.

The end of the locking striker 330 is formed like a claw 331 so as to surround at least a portion of both lateral sides of the rod part 313. More preferably, the claw 331 includes a first lead 332 and a second lead 333 configured to be in contact with both lateral sides of the rod part 313, wherein the first lead 332 and the second lead 333 may be configured to be symmetrical to each other or to have different shapes from each other. As such, the claw 331 including the first lead 332 and the second lead 333 may be configured to absorb the variation according to the shape of the rod part 313 and the timing at which the rod part 313 and the claw 331 are fastened to each other, and may be configured such that one surface of the rod part 313 contacts the inner surface of the claw 331 positioned between the first lead 332 and the second lead 333. Accordingly, the locking pin 310 is configured to be stably fastened to the locking unit 300.

Figure 3:
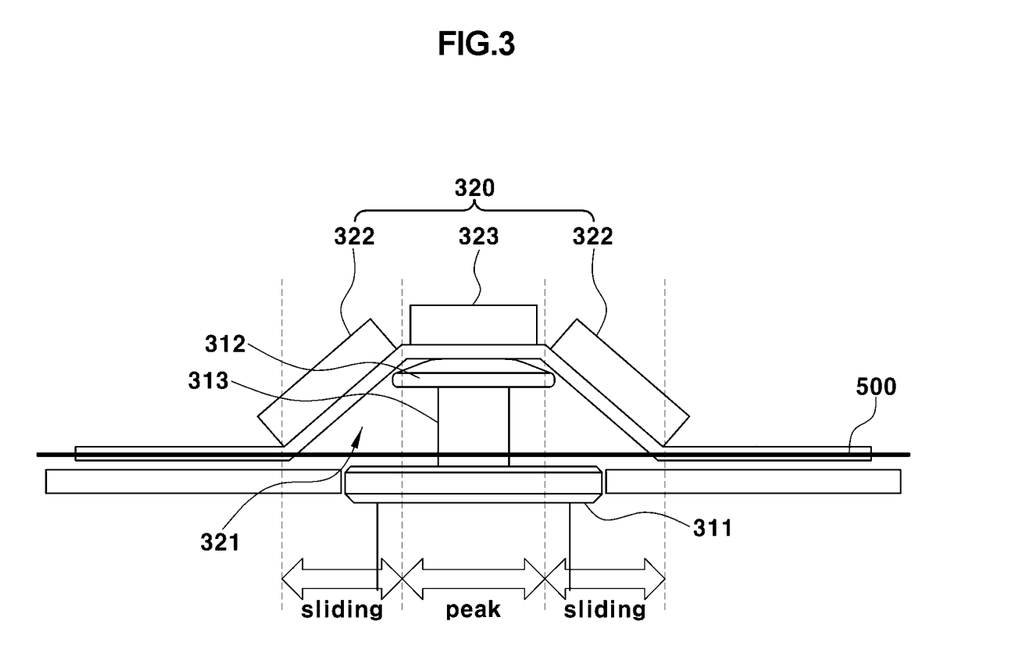
FIG. 3 is a view illustrating a magnetic guide section of the locking unit according to an embodiment of the present disclosure.
Figure 4:
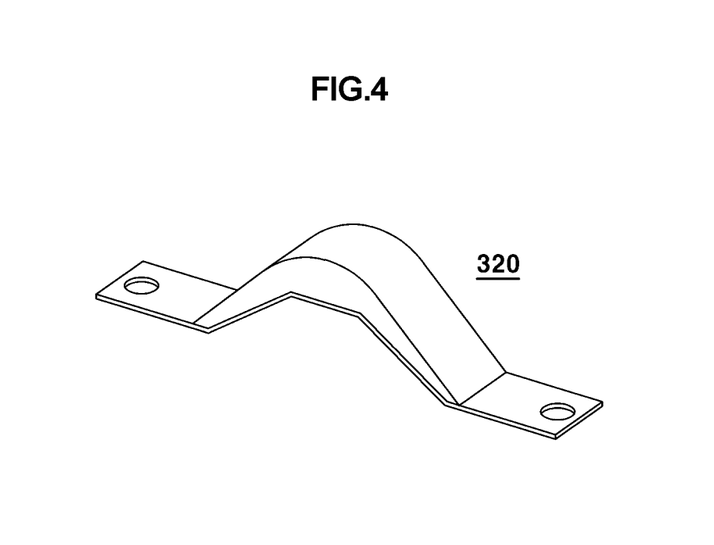
FIG. 4 is a view illustrating a magnetic guide section of the locking unit according to another embodiment of the present disclosure.

FIGS. 3 and 4 illustrate different embodiments of the magnetic guide section 320.

In FIG. 3, the inclined part 322 and the locking part 323 having a magnetic force are configured to be independently located inside the inlet part 321 located below the storage section 200 or the magnetic section 210 on the inner side of the storage section 200.

In comparison, FIG. 4 illustrates another embodiment of the present disclosure including an integral part having uniform magnetic force. That is, the integrally formed magnetic guide section 320 may be configured to have a different height so that a difference in magnetic force between the edge and the center of the magnetic guide section is generated.

The magnetic guide section 320 is configured to have the locking part 323 having the strongest magnetic force at the deepest position of the inlet part 321, and the inclined part 322 located at the edge may be configured to have relatively low magnetic force compared to the locking part 323.

As such, the magnetic guide section 320 may be integrally configured, or may be configured by a combination of magnetic bodies.

Moreover, according to another embodiment of the present disclosure, the locking pin 310 is configured to be inserted in a position facing the lower surface of the magnetic part 210 that does not include a separate storage section 200, so that the locking pin 310 may be configured to pop up due to the magnetic guide section 320 located at the magnetic section 210.

Figure 5A:
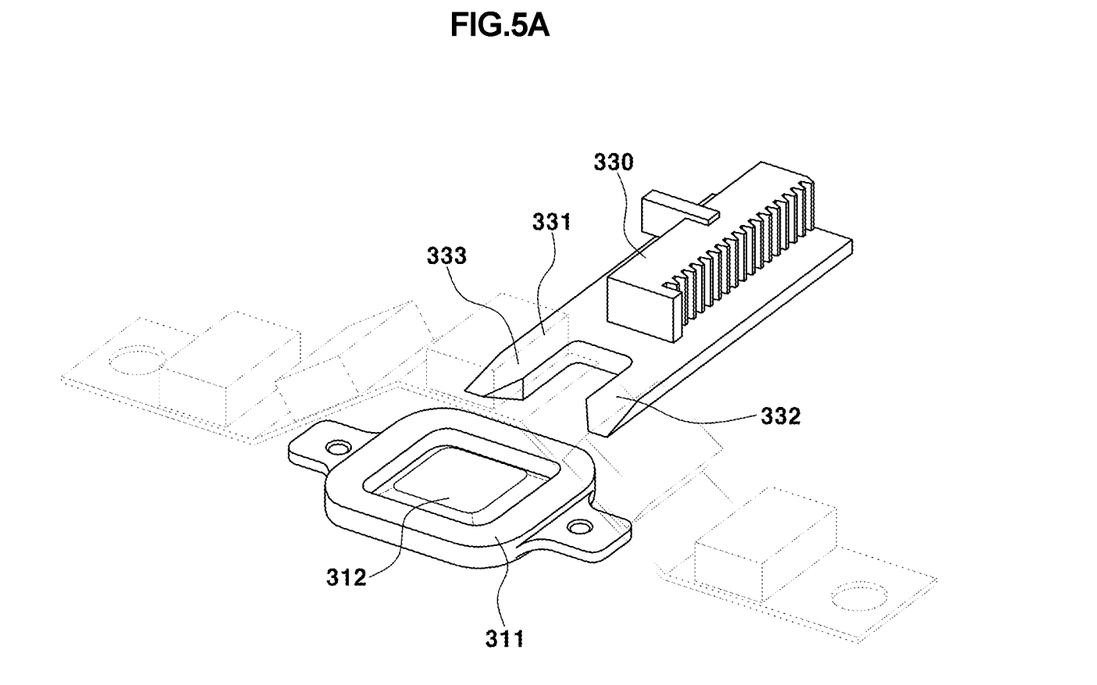
FIG. 5A is a view the configuration of the locking unit before the locking unit is protruded.
Figure 5B:
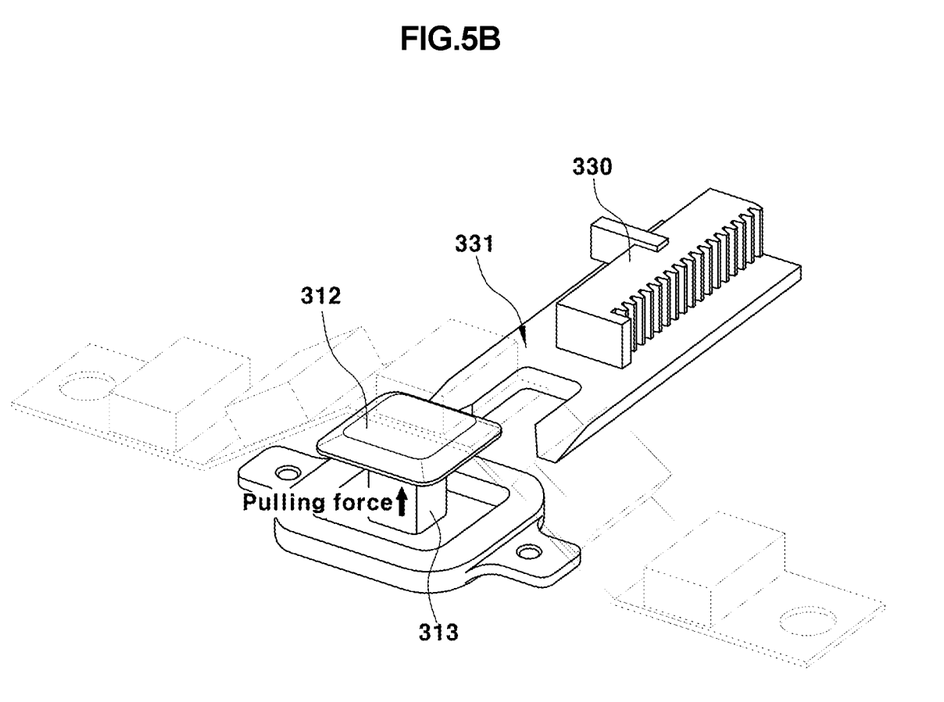
FIG. 5B is a view illustrating the configuration of the locking unit when the locking pin is protruding.
Figure 5C:
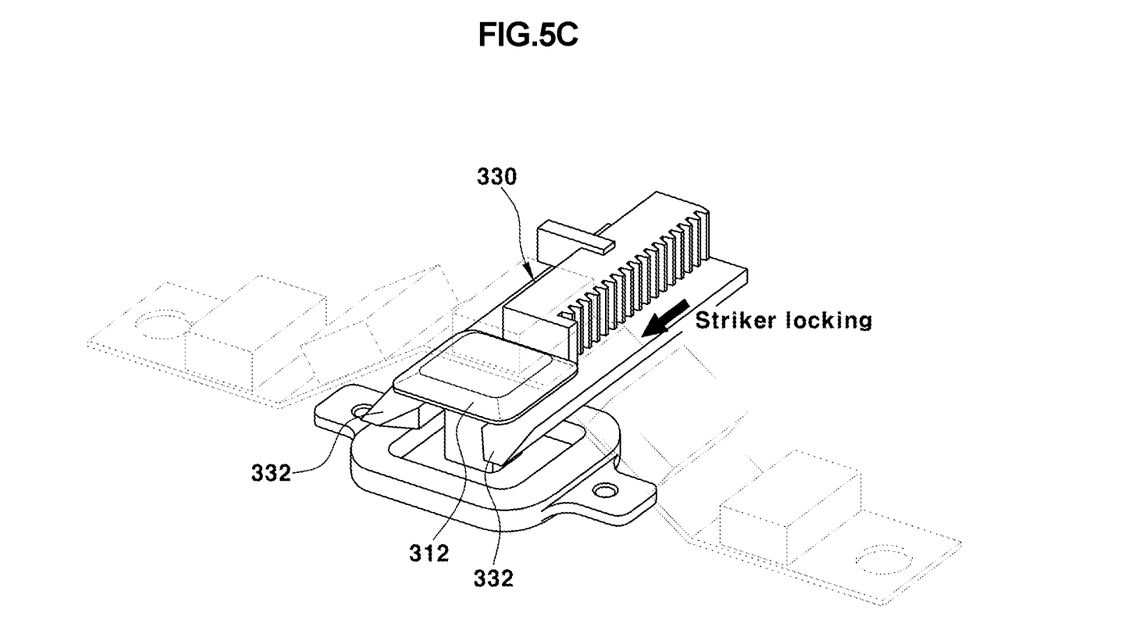
FIG. 5C is a view illustrating the configuration of the locking unit when the locking unit is protruding and fastened to a locking striker.

FIGS. 5A to 5C sequentially illustrate a process of deploying the locking striker 330 at a position where the locking pin 310 faces the locking unit 300.

FIG. 5A illustrates the case in which the storage section 200 is moved to the upper surface of the locking pin 310 located on the floor 500, and FIG. 5B illustrates the configuration in which as the storage section 200 is moved to a position corresponding to the locking pin 310, the locking pin 310 buried and positioned in the floor 500 is protruded in the vertical direction in response to the magnetic force of the magnetic guide section 320 located below the storage section or the magnetic section.

The magnetic guide section 320 includes the inclined parts 322 and the locking part 323, wherein the inclined parts 322 are located on both sides of the locking part 323 in the moving direction of the storage section 200. The plate part 312 of the locking pin 310 is configured to protrude upward through the upper surface of the floor 500 when the locking part 323 is moved to a position corresponding to the plate part 312.

In the case of the storage section 200 that is manually moved, when the storage section 200 moves further in one direction while the locking part 323 and the plate part 312 are in contact with each other, resistance force is applied in the moving direction of the storage section 200 to allow the user to recognize that the locking pin 310 and the magnetic guide section 320 may be fastened and locked in the corresponding region.

In the embodiment shown in FIG. 5B, when the locking part 323 is moved to a position corresponding to the locking pin 310, the plate part 312 is protruded to the position close to storage section 200 by the magnetic force of the locking part 323, and at least a portion of the rod part 313 fastened to the lower end of the plate part 312 is configured to move integrally.

When the plate part 312 of the protruded locking pin 310 contacts the locking part 323, the controller 400 controls the locking striker 330 to be deployed to surround at least a portion of both lateral sides of the rod part 313 where the plate part 312 is located. More preferably, the claw 331 positioned at the end of the locking striker 330 is configured to include two leads 332, 333 in which at least one lead 332 has an inner surface that is in contact with the rod part 313 at 50 to 70 degrees with respect to the moving direction of the storage section 200. As such, the rod part 313 is configured to absorb the deviation from the moving direction of the storage section 200 so that the locking striker 330 and the locking pin 310 are easily fastened to each other.

The controller 400 controls the deployment of the locking striker 330 in response to a signal indicating the contact between the locking part 323 and the plate part 312 of the locking pin 310. Alternatively, the controller 400 controls the deployment of the locking striker 330 by measuring the location of the storage section 200, and when the storage section 200 is moved to a position requested by a user where the locking pin 310 is located, the controller controls the deployment of the locking striker 330.

The foregoing detailed description is illustrative of the present disclosure. In addition, the above description shows and describes preferred embodiments of the present disclosure, and the present disclosure may be used in various other combinations, modifications, and environments. That is, changes or modifications may be made within the scope of the concept of the disclosure disclosed in the present disclosure, the scope equivalent to the disclosed content, and/or the skill or knowledge in the art. The described embodiment illustrates the best mode for implementing the technical idea of the present disclosure, and various changes required in the specific application fields and uses of the present disclosure are possible. Therefore, the detailed description of the present disclosure is not intended to limit the disclosure to the disclosed embodiment. In addition, the appended claims should be construed as including other embodiments.

The invention claimed is:

1. A movable carrier device for vehicles, the carrier device comprising:

a rail section positioned in a vehicle floor;

a storage section movable along the rail section;

a magnetic section located in the storage section and configured to rotate to be movable along the rail section;

a locking unit positioned inside of the floor and fastened to the floor and the storage section to restrict the movement of the storage section; and a controller configured to control the locking unit, wherein the storage section and the locking unit are fastened to each other.

2. The movable carrier device according to claim 1, wherein the locking unit comprises:

at least one locking pin disposed in the vehicle floor and protruding from the top of the vehicle floor;

a magnetic guide section applying a magnetic force, wherein the locking pin contacts the storage section; and a locking striker configured to surround at least a portion of the protruding locking pin to lock the storage section.

3. The movable carrier device according to claim 2, wherein the locking pin comprises:

a housing inserted and disposed in the vehicle floor;

a plate part disposed on an upper end of the housing;

a rod part disposed in the housing, the rod part being configured to perform a vertical movement; and a pin stopper disposed on the bottom of the rod part.

4. The movable carrier device according to claim 2, wherein the locking striker further comprises a claw configured to be fastened to the protruding locking pin.

5. The movable carrier device according to claim 2, wherein the magnetic guide section comprises:

an inlet part recessed in a vertical direction of the storage section;

a pair of inclined parts disposed on both sides of the inlet part on the inner side of the storage section at a predetermined inclination angle in the vertical direction of the storage section; and a locking part disposed between the pair of inclined parts and configured to contact the locking pin.

6. The movable carrier device according to claim 5, wherein the pair of inclined parts and the locking part are integrally formed, and the magnetic force of the locking part is greater than the magnetic force of the pair of inclined parts.

7. The movable carrier device according to claim 5, wherein the pair of inclined parts disposed on both sides of the inlet part comprise inclined surfaces symmetrical to each other with respect to the locking part.

8. The movable carrier device according to claim 5, wherein the controller is configured to control an inclination angle of the inclined parts.

9. The movable carrier device according to claim 2, wherein the controller is configured to control a magnetic force applied to the magnetic guide section.

10. The movable carrier device according to claim 1, wherein the rail part has a thickness that increases from a center to an edge.

11. The movable carrier device according to claim 1, wherein the magnetic force of a lateral end of the magnetic part is greater than the magnetic force applied to a central region and adjacent region of the rail part.

12. The movable carrier device according to claim 1, wherein the vehicle floor has non-magnetic properties.

13. A movable carrier device for vehicles, the carrier device comprising:

a vehicle floor;

a magnetic section movable over the vehicle floor; and a locking unit fastened to the vehicle floor and the magnetic section, the locking unit being configured to restrict the movement of the magnetic section, wherein the locking unit comprises:

at least one locking pin disposed in the vehicle floor and protruding from the top of the vehicle floor;

a magnetic guide section applying a magnetic force so that the locking pin contacts the magnetic section; and a locking striker configured to surround at least a portion of the protruding locking pin to lock the magnetic section.

\* \* \* \* \*